(No Model.)
P. GENDRON.
CHILD'S CARRIAGE.
No. 441,950. Patented Dec. 2, 1890.
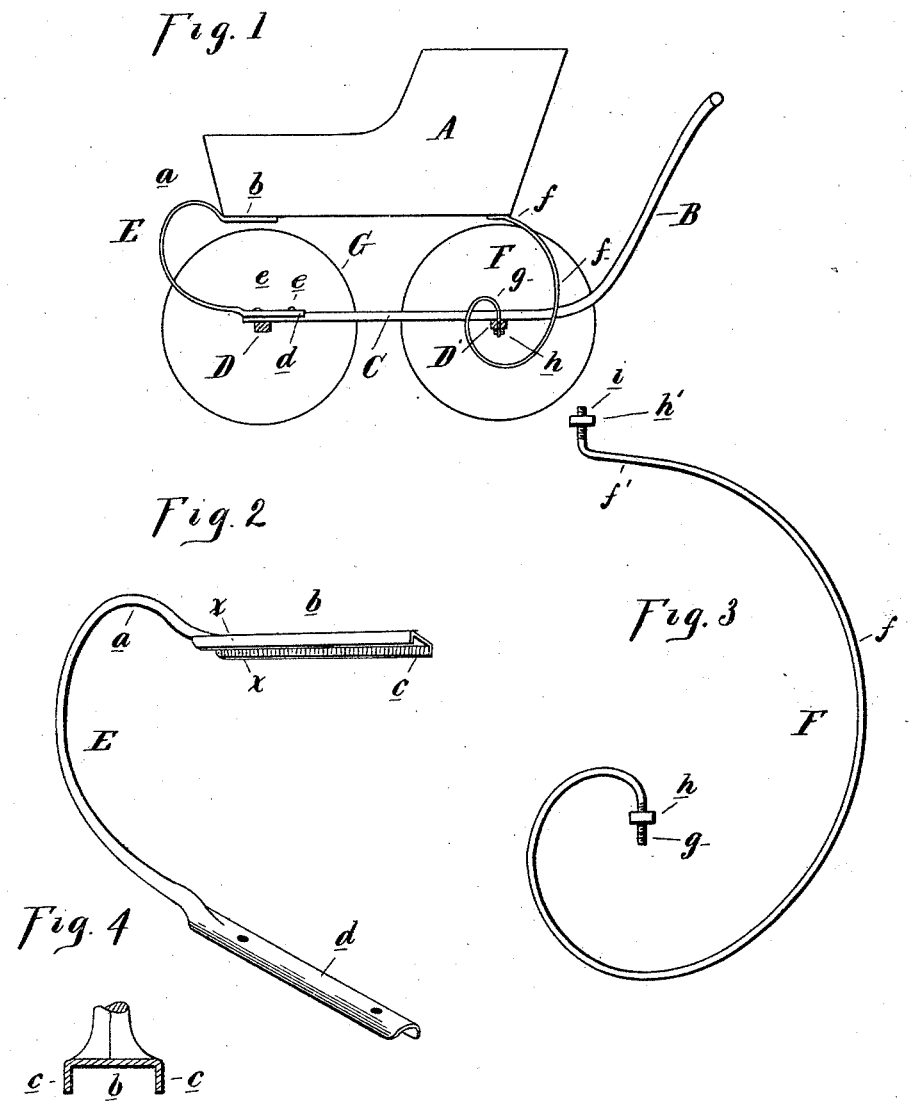
Witnesses:
P. M. Hulbert
M. B. Dougherty
Inventor:
Peter Gendron
By Thos. S. Sprague & Son
Atty.

UNITED STATES PATENT OFFICE.

PETER GENDRON, OF TOLEDO, OHIO, ASSIGNOR TO THE GENDRON IRON WHEEL COMPANY, OF SAME PLACE.

CHILD'S CARRIAGE.

SPECIFICATION forming part of Letters Patent No. 441,950, dated December 2, 1890.

Application filed July 10, 1890. Serial No. 358,337. (No model.)

*To all whom it may concern:*

Be it known that I, PETER GENDRON, a citizen of the United States, residing at Toledo, in the county of Lucas and State of Ohio, have invented certain new and useful Improvements in Children's Carriages, of which the following is a specification, reference being had therein to the accompanying drawings.

This invention relates to new and useful improvements in spring-gear for children's carriages; and the invention consists in the peculiar construction of the front and rear springs, whereby the best results may be obtained in an easy riding-carriage, and, further, whereby the carriage may be constructed in the cheapest and most attractive form, all as more fully hereinafter described.

In the accompanying drawings, Figure 1 is a diagram section of a child's carriage to which my improved gear is applied. Fig. 2 is a perspective view of the front spring. Fig. 3 is a side elevation of the rear spring. Fig. 4 is a cross-section on line $x\ x$, Fig. 2.

A is the body.

B is the handle, which has the forward extension C, to which are secured the front and rear axles D D', respectively.

E is the front spring, and F is the rear spring.

G are the wheels.

The front spring E is made of a round bar of spring metal, and consists of the inverted-C-shaped portion $a$, at the upper end of which is formed the horizontal extension $b$, which engages under the bottom of the body A, and is secured thereto by means of bolts passed through the body and through the portion $b$ of the spring. This portion $b$ is provided at its edges with the downwardly-projecting ridges or flanges $c$, which serve to materially strengthen it, the portion $b$ and $c$ forming practically a channel-shaped section, which is wrought out from a circular bar. At the lower end of the portion $a$ is formed the horizontal portion $d$, which engages over the forward extension C of the handle. This section $d$ is preferably curved in cross-section, as plainly shown in Fig. 2, and this is likewise wrought from the circular bar. It will thus be seen that my forward spring consists of a single circular bar formed of an inverted-C-shaped portion and having the ends wrought to form flat securing portions and curved or provided with flanges. The portion $d$ is secured to the extension C of the handle by means of bolts $e$.

The object of making the sections $d$ curved and of forming the flanges $c$ upon the portion $b$ is to give these parts the necessary strength without adding to the material and preventing the danger of breakage at this point, which would be frequent if they were simply flat.

The rear springs consist of a round bar of spring metal secured to the rear axle and having the bend $f$, which encircles the axle, and the forwardly-extending arm $f'$, extending beneath the body. This spring is secured to the axle by forming a bolt of the vertical portion $g$, screw-threading the end thereof, and securing it in position by means of the nuts $h$, while the upper portion of the spring is secured to the body by forming a bolt of the vertical portion $i$, which is suitably screw-threaded to receive the bolt $h'$.

It will be seen that my rear spring consists of a circular bar of spring metal bent to encircle the axle and to pass under the body at its upper end, and having the bolts by means of which it is secured at both ends formed integral therewith. It is evident that this can be done by simply forming a screw-thread on the ends of the vertical portions, inasmuch as the spring is made of a round bar.

What I claim as my invention is—

1. In a child's carriage, the combination, with the front spring consisting of a single piece of metal circular in cross-section, flanges integral therewith attached to the under side of the body of the vehicle and axle-reach, respectively, of an inverted-C-shaped spring, circular in cross-section, having its end screw-threaded and bent in a vertical position, said end adapted to pass through the body of the vehicle and axle thereof, respectively, substantially as described.

2. In a child's carriage, the combination, with the front spring, circular in cross-section, having its upper end terminating in flat portions with depending flanges, and having openings in said flat portions for the reception of screws, its lower end terminating in a semi-cylindrical portion having openings therein for the reception of bolts and adapted to be fitted over the end of the handle-bar or axle-reach and secured to the same, of an inverted-C-shaped spring bent at right angles at its upper end and screw-threaded, adapted to be passed through the floor of the body of the vehicle and secured in place by a nut, its lower end terminating in a screw-threaded bolt adapted to pass through the rear axle and therein secured, substantially as described.

In testimony whereof I affix my signature in presence of two witnesses.

PETER GENDRON.

Witnesses:
W. V. CULBERSON,
PERRY CRIPPEN.